United States Patent [19]
Pearson et al.

[11] Patent Number: 5,644,696
[45] Date of Patent: Jul. 1, 1997

[54] RECOVERING MULTI-VOLUME DATA SETS DURING VOLUME RECOVERY

[75] Inventors: Anthony Steve Pearson; Jerry Wayne Pence, both of Tucson, Ariz.

[73] Assignee: International Business Machines Corporation, Armonk, N.J.

[21] Appl. No.: 470,732

[22] Filed: Jun. 6, 1995

[51] Int. Cl.$^6$ .................................................. G06F 11/00
[52] U.S. Cl. ................................................ 395/182.04
[58] Field of Search .................... 395/182.04, 182.06, 395/182.13, 182.17, 182.18, 183.21, 489, 182.05; 364/268.5, 285.1

[56] References Cited

U.S. PATENT DOCUMENTS

| | | | |
|---|---|---|---|
| 4,310,883 | 1/1982 | Clifton et al. | 364/200 |
| 4,408,276 | 10/1983 | Plow | 364/200 |
| 4,507,751 | 3/1985 | Gawlick et al. | 364/900 |
| 4,587,628 | 5/1986 | Archer et al. | 364/900 |
| 4,601,012 | 7/1986 | Aiken | 364/900 |
| 4,750,106 | 6/1988 | Aiken | 364/200 |
| 4,868,744 | 9/1989 | Reinsch et al. | 364/280 |
| 4,908,826 | 3/1990 | Hertrich | 371/40.1 |
| 4,916,605 | 4/1990 | Beardsley et al. | 364/200 |
| 4,935,941 | 6/1990 | Jones | 375/80 |
| 4,974,156 | 11/1990 | Harding et al. | 364/200 |
| 5,138,710 | 8/1992 | Kruesi et al. | 395/575 |
| 5,239,649 | 8/1993 | McBride et al. | 395/650 |
| 5,321,570 | 6/1994 | Behr et al. | 360/121 |
| 5,321,832 | 6/1994 | Tanaka et al. | 395/600 |
| 5,327,570 | 7/1994 | Foster et al. | 395/800 |
| 5,379,418 | 1/1995 | Shimazaki et al. | 395/182.18 |
| 5,388,258 | 2/1995 | Larsson et al. | 395/600 |
| 5,388,260 | 2/1995 | Monahan et al. | 395/600 |
| 5,404,502 | 4/1995 | Warner et al. | 395/182.18 |
| 5,454,099 | 9/1995 | Myers et al. | 395/182.18 |
| 5,535,381 | 7/1996 | Kopper | 395/182.04 |

FOREIGN PATENT DOCUMENTS

0/516/900A1  12/1992  European Pat. Off. ......... G06F 11/14

OTHER PUBLICATIONS

IBM Technical disclosure Bulletin, "Fault-tolerant Binary Search for Indexed Sequential Files", vol. 25, No. 3A, Aug. 1982.
IBM Technical disclosure Bulletin, "Material Logistics System", vol. 29, No. 4, Sep. 1986.
IBM Technical disclosure Bulletin, "Restoring data From DASD Volumes Having Hardware Errors", vol. 31, No. 7, Dec. 1988.
IBM Technical Disclosure Bulletin, "Bus Data Integrity and Fault Tolerance", vol. 34, No. 12 May 1992.
IBM Technical Disclosure Bulletin, "Multiple Levels of Serialization for Backing Up open Data Sets", vol. 37, No. 06A, Jun. 1994.

*Primary Examiner*—Robert W. Beausoliel, Jr.
*Assistant Examiner*—Joseph E. Palys
*Attorney, Agent, or Firm*—Baker, Maxham, Jester & Meador

[57] ABSTRACT

A system for recovering multi-volume data sets that are stored in one or more volumes that have failed with a substantial level of automation and flexibility. Data can be recovered from backup storage when multiple volumes fail, as in a "catastrophic" data loss. For each volume, all data sets partially or completely stored on the selected volume prior to a failure of that volume are identified. Each single-volume data set stored on the selected volume prior to the failure is restored from backup storage. Upon identifying a multi-volume data set whose beginning segment was stored on the selected volume, the entire data set is restored. Data can also be recovered from backup storage when a particular volume fails, such as after a "head crash." All data sets partially or completely stored on the selected volume prior to a failure of that volume are identified. Each single volume data set stored on the selected volume prior to the failure is recovered from backup storage. For each multi-volume data set having a segment stored on the selected volume prior to the failure, a predetermined message is issued to a human operator. Alternatively, multi-volume data sets are recovered if consistent. Otherwise, if valid data has been lost, a warning message is issued.

27 Claims, 9 Drawing Sheets

RECOVERING MULTI-VOLUME DATA SETS DURING VOLUME RECOVERY

BACKGROUND OF THE INVENTION

1. Field of the Invention

The present invention concerns the recovery of multi-volume data sets that are stored in multiple direct access storage devices ("DASDs"). More specifically, the invention provides a method and apparatus useful in recovering multi-volume data sets from one or more DASDs that have failed, while providing a substantial level of automation, data presentation, and improved performance.

2. Description of Related Art

The primary non-volatile storage device used in today's computers is the DASD. DASDs include a number of different memory storage devices, such as magnetic disk storage devices ("hard drives"), optical data storage disks, and other devices that permit the computer to "directly access" the storage media. Typically, each DASD associated with a computer contains a "volume" of data. Since most mainframe computers typically need more storage space than a single volume can provide, most mainframes have access to multiple volumes (via multiple DASDs).

A "data set" is a collection of information, such as a "file". Typically, the information of a data set is contiguous on a single volume, in that the information constitutes a continuous stream of bits from the beginning of the data set to its end. Despite these characteristics, computers with access to multiple volumes are able to advantageously store data sets by "striping" them across two or more volumes. Particularly, these computers break a single data set into segments, and store each segment on a different volume. This is somewhat like cutting a continuous ticker tape into various sections, and filing each section in a different filing drawer. Data sets stored in this manner are called "multi-volume" data sets because they reside on multiple volumes. FIG. 1 illustrates an example, where there are four volumes 100–103 of data. Data set "A" resides on volume 100. Data set "B" is a multi-volume data set that includes the components "B1" and "B2", residing on volumes 101–102. Data set "C", a multi-volume data set comprising components C1–C4, resides on volumes 100–103.

As shown in FIG. 1, the data sets stored on the volumes 100–103 may be "backed up" on another media, such as magnetic tape. In the present example, data set "C" (comprised of segments C1–C4) exists on a tape backup 106, data set "B" (comprised of segments B1–B2) exists on a tape backup 107, and data set "A" exists on a tape backup 108.

A problem arises if, for example, volume 101 fails. Such a failure may result from a number of known causes, such as a "head crash." Prior to its failure, volume 101 included segments of the "B" and "C" data sets. To restore "B1" to volume 101, most data recovery systems require the restoration of the entire "B" data set; likewise, to restore "C3" to volume 101, the entire data set "C" must be restored. Typically, recovery in this manner is required because the tape backup stores each data set as a continuous whole, without providing separate access to the individual segments. In some circumstance, restoration of an entire data set may be undesirable. On one hand, restoring "B1" and "C3" to volume 101 is an improvement, since volume 101 has failed and would otherwise be blank. However, the copies of "C1", "C2", "C4", and "B2" on volumes 100 and 102–103 may have been changed after the last backup was made. If this is the case, then restoring the multi-volume data sets "B" and "C" would destroy several recently changed data segments, which were stored after the last backups of "B" and "C".

The scheme described above differs from Redundant Array of Independent Disks ("RAID") implementations. RAID systems are capable of recovering data from their DASDs by recording redundant parity within a fixed cell of shared disks. RAID systems, however, are limited by a maximum number of volumes that can be effectively recovered, such as one or two volumes. Furthermore, RAID configurations reconstruct data using parity, rather than recovering data from separate backup media, such as magnetic tape.

SUMMARY OF THE INVENTION

The present invention concerns a method and apparatus for recovering multi-volume data sets from one or more DASDs that have failed, while providing a substantial level of automation and flexibility for the storage administrator. In one embodiment, the invention concerns a method of recovering data formerly stored on multiple failed DASDs from backup storage. For each of the DASDs, all data sets partially or completely stored on the selected DASD prior to a failure of that DASD are identified. Each single volume data set stored on the selected DASD prior to the failure is restored from backup storage. Upon identifying a multi-volume data set whose first segment was stored on the selected DASD, the entire data set is restored. These steps are repeated for each remaining one of the DASDs.

Another embodiment of the invention is employed when a particular DASD fails to recover data formerly stored on the DASD from backup storage. First, all data sets partially or completely stored on the failed DASD prior to a failure are identified. Each single volume data set stored on the selected DASD prior to the failure is recovered from backup storage. For each multi-volume data set having a segment stored on the selected DASD prior to the failure, a predetermined message is issued, indicating that data was not recovered, thereby enabling a storage administrator to determine the best course of action.

The present invention contemplates still another embodiment, which is employed when a particular DASD fails. First, all multi-volume data sets having a segment stored on a failed DASD prior to a failure are identified. For each of these multi-volume data sets, the data set is only recovered if it is identical to the most recent stored backup copy of the data set; otherwise, a stale version of the data set would be recovered. Thus, multi-volume data sets are only recovered if they are "consistent". If a data set is not consistent, but no valid data has been lost, no action is needed. If, however, the data set is not consistent and valid data was lost, a warning message is issued.

Another embodiment of the invention concerns a data storage device tangibly embodying a program of machine-readable instructions executable by a digital data processor to perform certain method steps for recovering data from failed DASDs.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DESCRIPTION OF PREFERRED EMBODIMENT

Broadly, the present invention concerns a method and apparatus for recovering data from backup storage to one or more DASDs after one or more DASDs fail. Advantageously, the invention provides different options to automatically or manually recover the appropriate multi-volume data. In the illustrated examples that follow, "volume" corresponds to the data stored on a single DASD. A "volume", however, may correspond to a part of a DASD, multiple DASDs, or another selected grouping of data.

Hardware Components & Interconnections

Figure 2:
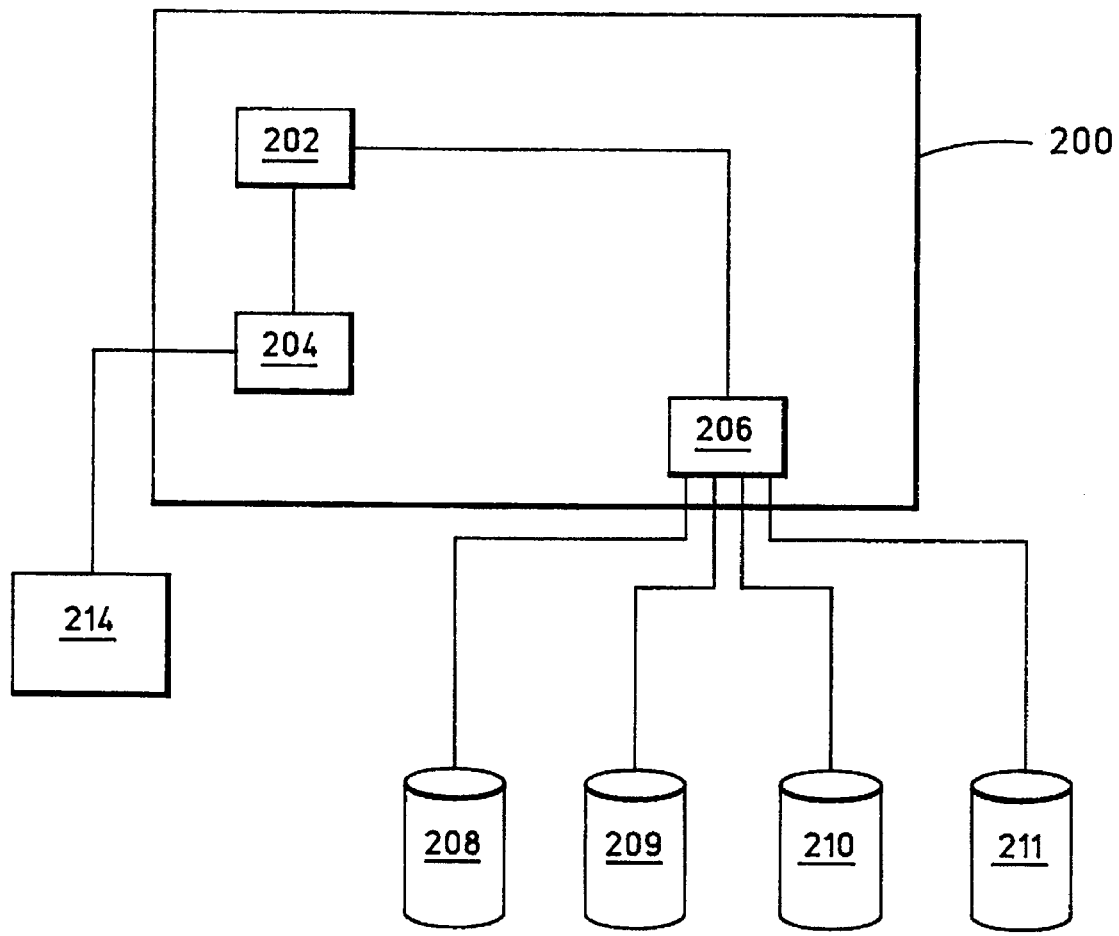
FIG. 2 is a diagram depicting an illustrative embodiment of hardware components and interconnections for implementing the present invention.

Generally, the invention is implemented in a computer system that includes a central processing unit ("CPU") connected to multiple DASDs, which store data pursuant to commands from the CPU. FIG. 2 depicts an exemplary hardware structure for implementing the invention. A CPU 200 includes a processor 202, a RAM buffer 204, and an I/O unit 206. The CPU 200, for example, may comprise a mainframe computer such as an IBM series 9000 using the MVS operating system. The I/O unit 206 provides an interface between the processor 202 and multiple data volumes 208–211. In the illustrated example, each of the volumes 208–211 comprises a different DASD, such as an IBM model 3390 data storage device.

Figure 3:
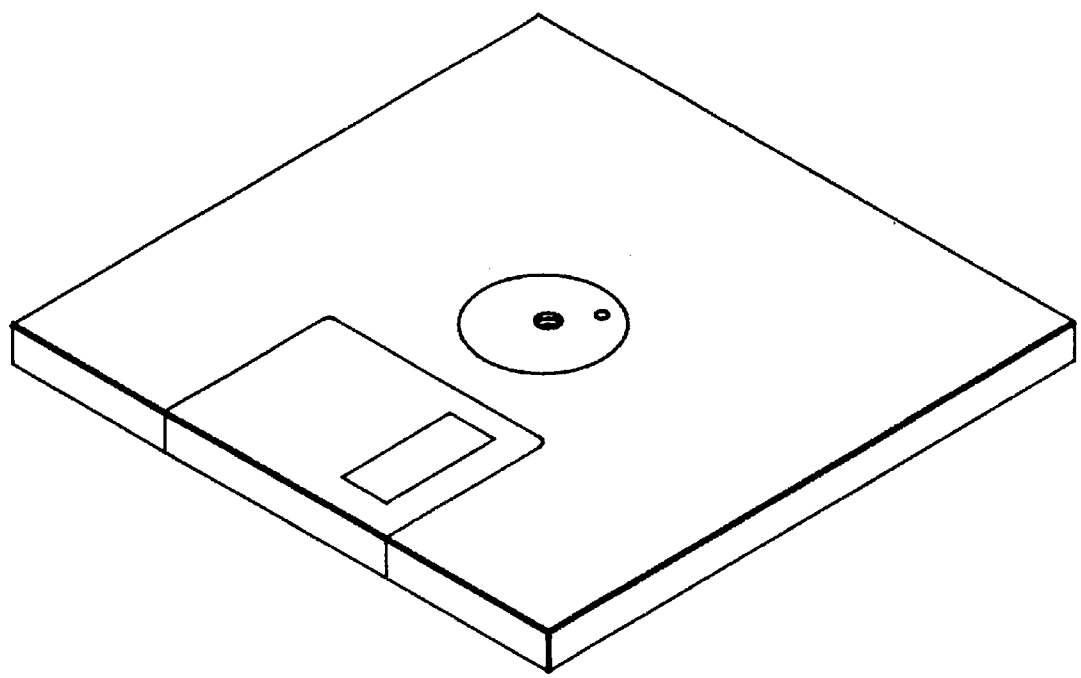
FIG. 3 is a diagram of an exemplary data storage medium to store a machine-readable program of instructions in accordance with the invention.

The RAM buffer 204 is connected to a non-volatile program storage unit 214, which may comprise another DASD, for example. Alternatively, the program storage unit 214 may comprise a variety of different data storage media, such as optical media, magnetic tape, electrically programmable memory, or paper punch cards. Still another possible implementation of the program storage unit 214 is a magnetic data storage diskette, such as the type shown in FIG. 3. In an exemplary embodiment, the present invention is implemented by loading a program of instructions from the program storage unit 214 to the RAM buffer 204, and then operating the processor 202 to execute the instructions stored in the RAM buffer 204.

Data Storage Conventions

Figure 1:
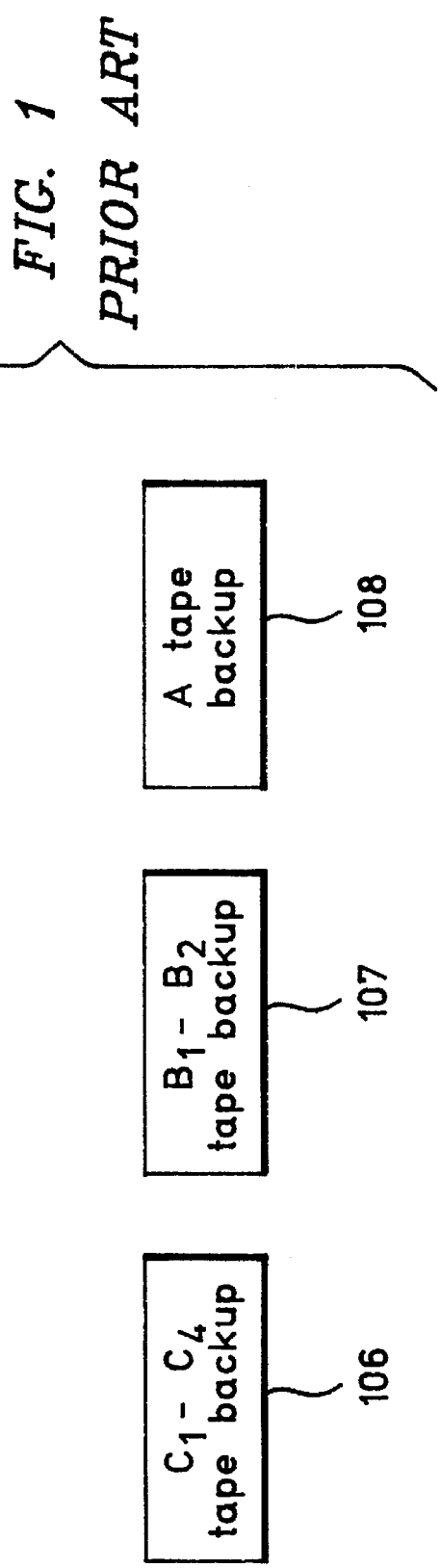
FIG. 1 is a diagram depicting the storage of various single- and multi-volume data sets on a group of DASDs.

Certain items of information may be associated with each volume. First, the DASD that contains a volume also contains Volume Table of Contents ("VTOC") that indicates the names and memory locations of the different data segments stored on that DASD. Table 1 (below) depicts an example of a VTOC for the volume 100, which contains data segments "A" and "C4" as shown in FIG. 1.

TABLE 1

| Volume 100 VTOC |
|---|
| DATA SEGMENT NAME: A |
| memory address 123456<br>single-volume data set<br>DATA SEGMENT NAME: C4 |
| memory address 182834<br>part of multi-volume data set, non-first segment |

Although a data set may be resident across several volumes, the data set may contain an End of Data ("EOD") indicator well before the data set's final byte. Although it accompanies the data set, data following the EOD indicator comprises surplus data that is not essential to the information of the data set. The data set segment that contains the EOD indicator also includes a Last Active Record ("LSTAR") indicator. As an example, a data set "C" may reside across the four volumes 208–211, in the form of C1–C4; however, the data set's EOD indicator may be present in segment "C2". In this case, the segment "C2" contains the LSTAR for this data set. Here, the segments "C1" and "C2" are "active", but the segments C3–C4 contain surplus information and may be referred to as "inactive".

The end of each data set segment includes a pointer that either (1) continues to the next segment in the data set, contained on a different volume, or (2) indicates the end of the data set.

Figure 4:
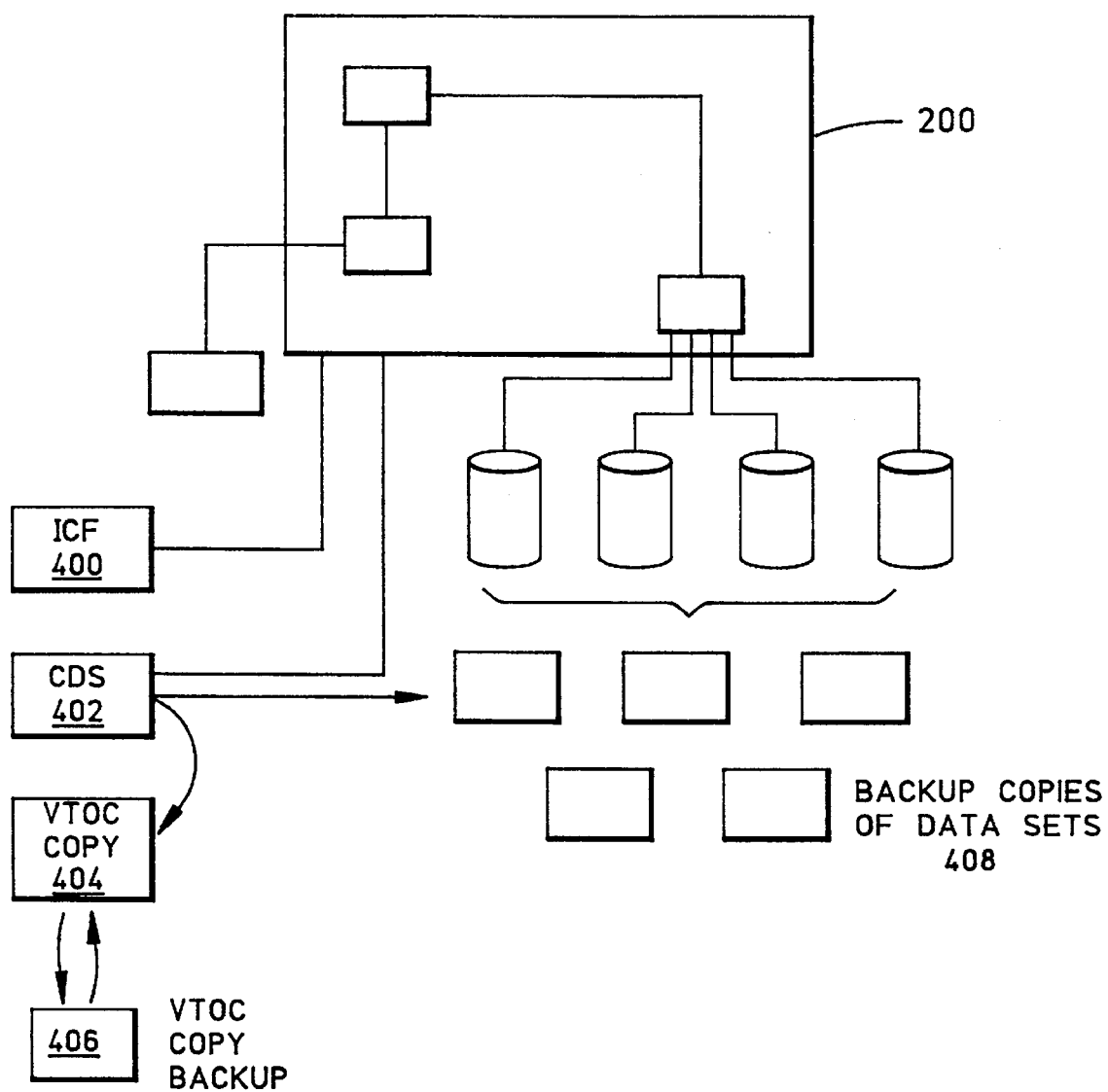
FIG. 4 is a diagram of an exemplary hardware environment for the invention, illustrating the use of various data storage organization tools.

As shown in FIG. 4, the CPU 200 of the present invention may employ a number of other data structures and other facilities to assist in organizing the storage of data. One useful data structure available to the CPU 200 is the Integrated Catalog Facility ("ICF") 400. For each data set stored in the volumes 208–211, the ICF 400 might provide the following information, for example:

1. The name of the data set (e.g. "C").
2. The state of the data set's "change indicator". The change indicator typically comprises a binary flag that is set (i.e.,=1) if the data set has been changed since the last backup was performed, but otherwise clear (i.e.,= 0).
3. An identification of the volumes 208–211 that contain the data set.
4. Whether the data set is "VSAM" type. VSAM type refers to a data set that, rather than constituting data only, is comprised of both data segments and index segments. An index segment provides an index to the data contained in the data segments of the same data set.

Other data structures accessible by the CPU 200 include the "VTOC copy". Each DASD's VTOC is duplicated elsewhere by the CPU 202 in the form of a VTOC copy 404, to assist in data recovery in the event of a DASD failure. The VTOC copy 404 is also backed up, usually on magnetic tape, to provide a VTOC backup copy 406. The CPU 200 also has access to the Control Data Set ("CDS") 402. The CDS 402 contains pointers indicating the locations of certain important data. For instance, the CDS 402 points to the VTOC copy 404, the VTOC copy backup 406, and backup copies 408 of the data sets.

Universal Recovery Method

Figure 5:
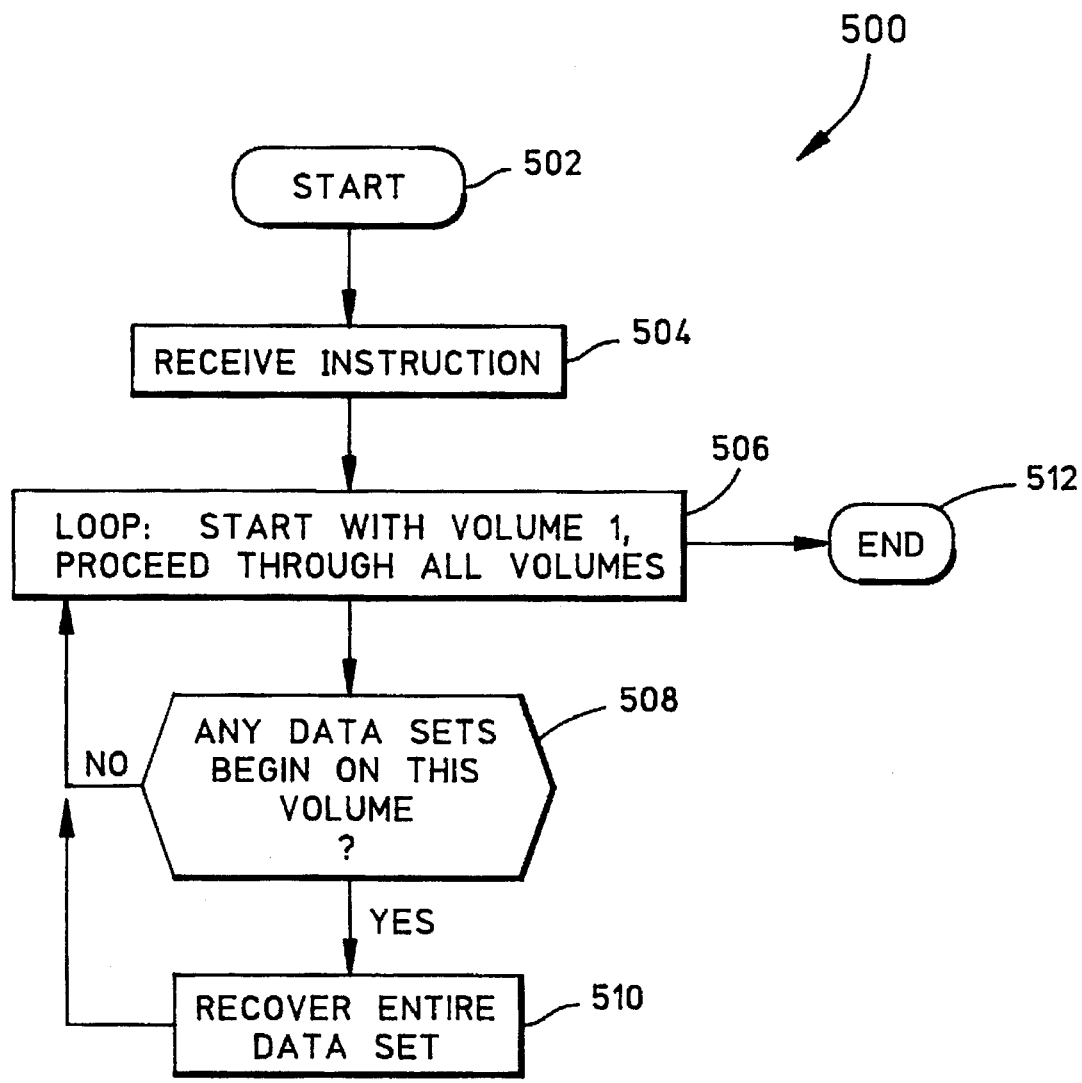
FIG. 5 is a flowchart of a universal recovery method, pursuant to one embodiment of the present invention.

FIG. 5 depicts an exemplary sequence of tasks 500 to carry out the method of the present invention. For illustrative purposes, the tasks 500 are described in the context of the hardware environment of FIG. 2. The tasks 500 operate to recover data stored on the volumes 208–211 in the event of a "catastrophic" failure, i.e. where all or nearly all volumes 208–211 fail. To provide explanation by way of an example, FIG. 6 details the volumes 208–211, the contents of the volumes 208–211, and the volumes' tape backups 600–602.

The tasks 500 are preferably executed by the processor 202. More particularly, after the routine 500 is initiated in task 502, the processor 202 receives an instruction in task 504. Such an instruction is preferably issued by a storage administrator to the CPU 200, by entering a command specifying the volumes to recover. For instance, the storage administrator may issue a command such as "RECOVER VOLUMES 208–211".

After the processor 202 receives this instruction in task 504, task 506 begins a loop that sequentially examines all volumes identified in the instruction. The volume under examination is referred to as the "current" volume. If desired, the loop may progress through the volumes in the same order they were identified in the instruction; in this case, task 506 begins the loop with the volume 208. Hence, the volume 208 is the current volume.

After starting the loop in task 506, query 508 asks whether there are any data sets whose first segments reside on the current volume, i.e. data sets that begin on the current volume. This includes single volume data sets that reside on the current volume, as well as multi-volume data sets whose first segment resides on the current volume. The processor 202 answers query 508 by examining data storage information maintained for the current volume. For example, the processor 202 may refer to the VTOC copy 404 and CDS 402 to identify data sets having their first segments on the current volume. If no data sets have a first segment on the current volume, control returns to task 506 and the loop advances.

However, if the first segment of a data set resides on the current volume, the processor 202 executes task 510 to recover the entire data set. This scheme efficiently ensures that no multi-volume data set is recovered more than once— recovery of a multi-volume data set is only initiated during processing of the volume containing its first data segment. In the present example, where volume 208 (FIG. 6) is the current volume, data set "X" begins on the current volume. Accordingly, task 510 recovers data set "X", by copying the backup data set from the tape backup 602. Data set "X" may be recovered to any volume desired; since the routine 500 inherently concerns a "catastrophic" failure of all volumes, the content of the volumes is presently blank or subject to being written over. Data set "Z", however, is not recovered while volume 208 is the current volume, since Z's first data segment resides elsewhere (i.e., on volume 211).

When volume 209 is the current volume, query 508 identifies the data set "Y" as having its first data segment on that volume. In this case, task 510 recovers the segments "Y1" and "Y2" from the tape backup 601, to one or more target volumes; the target volumes may be identified by previous user-entered selections or by a memory management routine, for example. When volume 209 is the current volume, however, data set "Z" is not recovered, since "Z" begins on volume 211. After tasks 506, 508, and 510 (as appropriate) for each volume, task 506 directs control to task 512, where the routine 500 ends. In this manner, after all volumes have been recovered, each data set is only recovered once.

Single Volume Recovery Method—"NONE" Option

Figure 6:
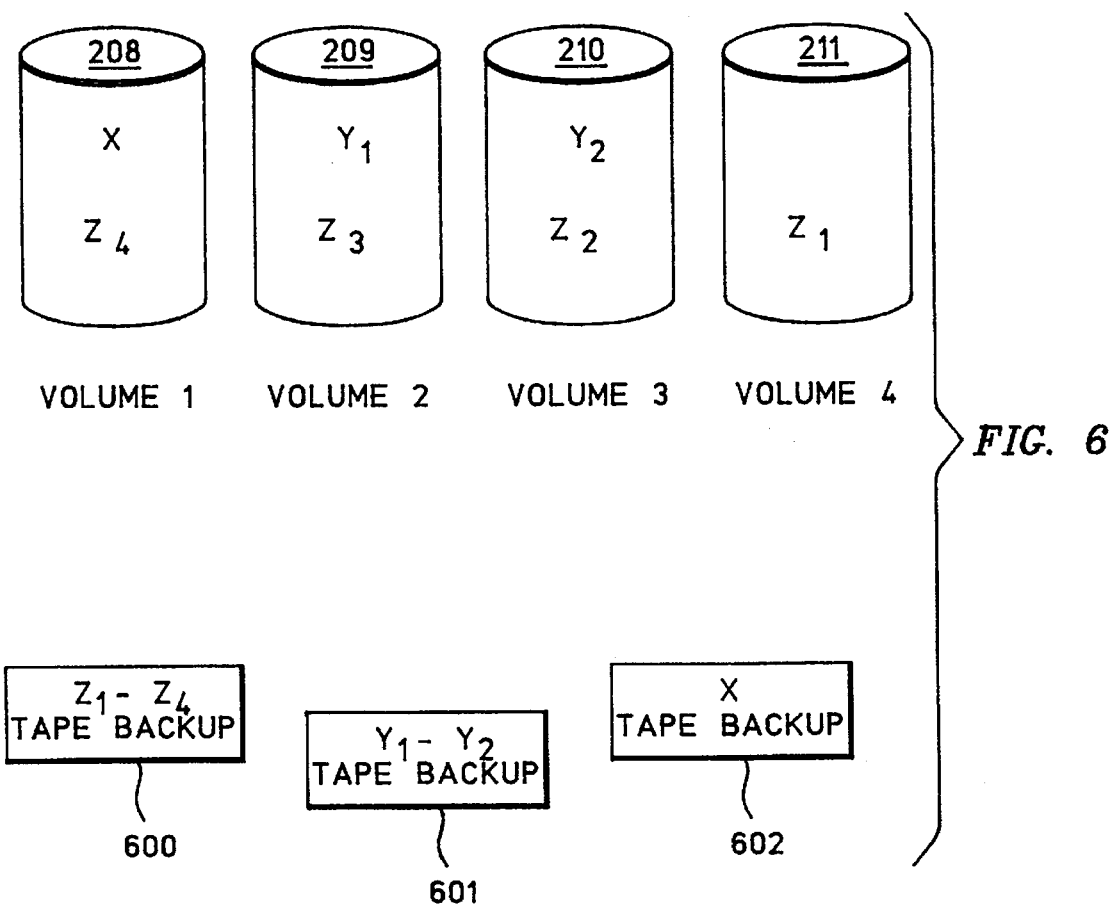
FIG. 6 is a diagram of storage volumes and tape backups to illustrate the operation of the invention.
Figure 7:
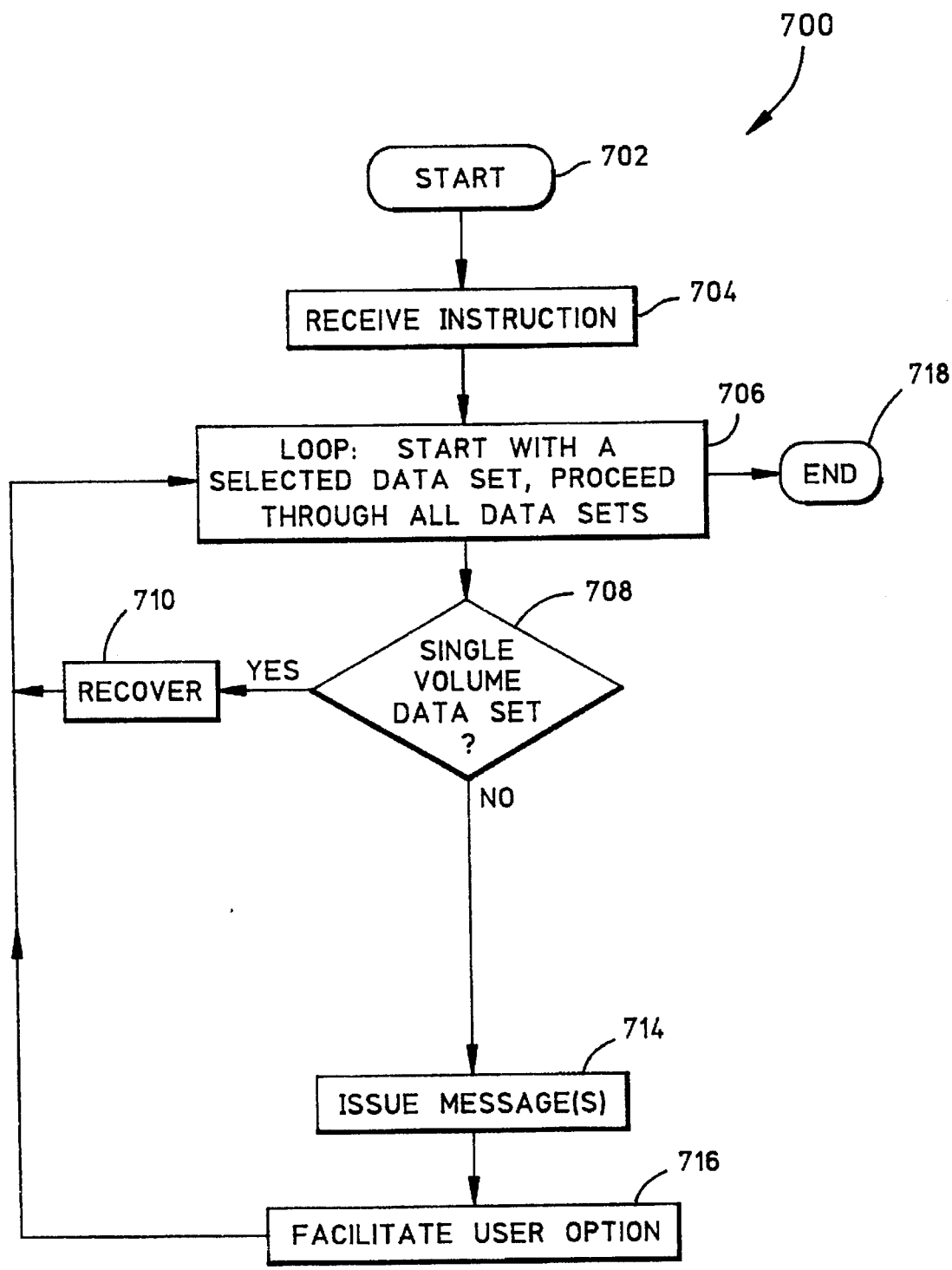
FIG. 7 is a flowchart of a single volume recovery method ("NONE" Option), pursuant to one embodiment of the invention.

FIG. 7 depicts another embodiment of tasks to carry out the method of the present invention, in the form of a routine 700. The tasks 700, like tasks 500 above, are described in the context of the hardware environment of FIG. 2 and the example of FIG. 6. The routine 700 is used to recover data stored on the volumes 208–211 in the event of a non-catastrophic failure, such as a "head crash" where a DASD corresponding to one of the volumes 208–211 fails. The "NONE" option refers to the actions taken to recover multi-volume data sets; broadly, recovery is aborted, except pursuant to commands manually issued by the storage administrator, as discussed below. Thus, the "NONE" option refers to which multi-volume data sets are automatically recovered—None.

The tasks 700 are preferably executed by the processor 202. More particularly, after the routine 700 is initiated in task 702, the processor 202 receives an instruction in task 704. Such an instruction is preferably issued by a storage administrator to the CPU 200, by entering a command identifying the volume that has failed, and for which recovery is desired. For instance, the storage administrator may issue a command such as "RECOVER VOLUME 208".

After the processor 202 receives this instruction in task 704, task 706 begins a loop that sequentially examines all data sets contained on the identified volume. The data set under examination is referred to as the "current" data set. The loop may progress through the data sets in any convenient order.

After the loop is started in task 706, query 708 asks whether the current data set is a single volume data set. If so, task 710 recovers this data set to one or more target volumes; the target volumes may comprise the volume that failed, and/or another volume as desired, as identified by previous user-entered selections or by a memory management routine, for example. If volume 208 is being recovered, for example, query 708 will identify "X" as a single volume data set in task 708, and then task 710 will initiate recovery.

If the current data set is not a single volume data set, however, the current data set is not immediately recovered. In particular, control advances to task 714, which issues a predetermined message. This message may be issued to a human, such as the storage administrator, or to a machine-readable data storage location such as an activity log. The message may state, for example, "DATA SET Z IS A MULTI-VOLUME DATA SET—NO RECOVERY HAS BEEN INITIATED." Then, after task 714, task 716 assists the storage administrator in proceeding as desired. Task 716, for example, may (1) abort any recovery of the current multi-volume data set, (2) initiate recovery of the data set, after authorization from the storage administrator, (3) perform certain checks to determine whether the data set is consistent, (4) carry out a combination of the foregoing, or (5) perform another option. After task 716, control returns to task 706, where the next data set is selected for processing. After all data sets have been processed, the routine 700 ends in task 718.

Single Volume Recovery Method— "CONSISTENT" Option

Figure 8:
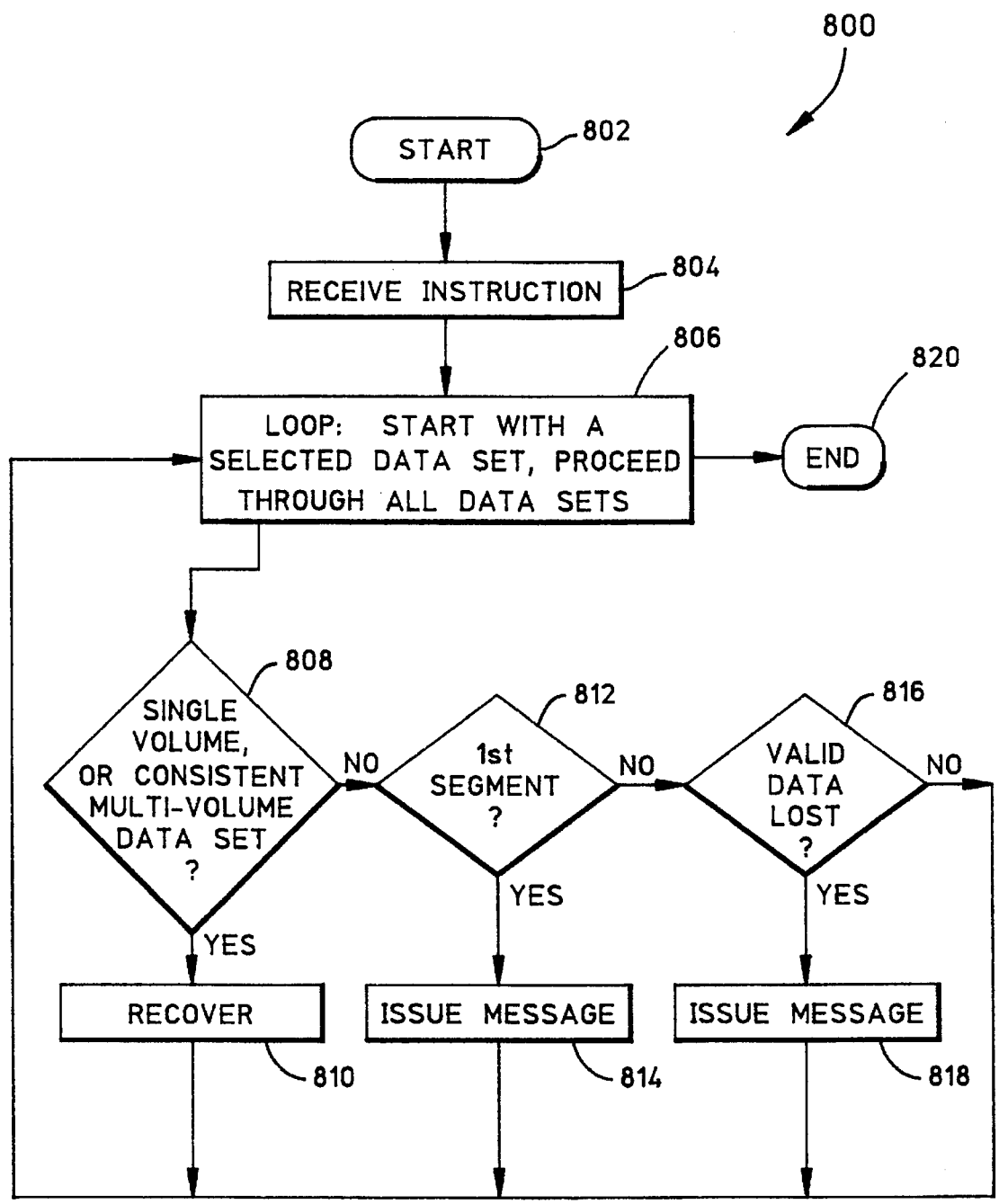
FIG. 8 is a flowchart of a single volume recovery method ("CONSISTENT" Option), pursuant to one embodiment of the invention.

FIG. 8 depicts another embodiment of the method of the present invention, in the form of a routine 800. The tasks 800, like tasks 700 above, are described in the context of the hardware environment of FIG. 2 and the example of FIG. 6. The routine 800 is used to recover data stored on the volumes 208–211 in the event of a non-catastrophic failure, such as a "head crash" where a DASD corresponding to one of the volumes 208–211 fails. The "CONSISTENT" option refers to the actions taken to recover multi-volume data sets; broadly, recovery is carried out under circumstances where data consistency can be assured.

The tasks 800 are preferably executed by the processor 202. More particularly, after the routine 800 is initiated in task 802, the processor 202 receives an instruction in task 804. Such an instruction is preferably issued by a storage administrator to the CPU 200, by entering a command specifying the volume that has failed, and for which recovery is desired. For instance, the storage administrator may issue a command such as "RECOVER VOLUME 209".

After the processor 202 receives this instruction in task 804, task 806 begins a loop that sequentially examines all data sets contained on the identified volume. The data set under examination is referred to as the "current" data set. The loop may progress through the data sets in any convenient order.

After the loop is started in task 806, query 808 asks whether the current data set is a single volume data set or a consistent multi-volume data set. A multi-volume data set is consistent if has not been changed since it was most recently backed up. In query 808, the processor 202 can determine whether the current data set is a single- or multi-volume data set by examining the VTOC copy for the current volume. Likewise, in query 808 the processor 202 can determine whether the data set is consistent by examining the change indicator associated with that data set; as mentioned above, the change indicator may be maintained, for example, in an ICF.

If query 808 finds the current data set to be consistent, task 810 automatically recovers the current data set to one or more target volumes, the target volumes may be identified by previous user-entered selections or by a memory management routine, for example.

If, however, query 808 finds the current data set to be part of an inconsistent multi-volume data set, then query 812 asks whether the current data set represents the first segment of a multi-volume data set. This determination can be made, for example, by examining the ICF associated with that data set. If so, task 814 issues a predetermined message, advising that the current data set will not be recovered automatically. This message may state, for example, "FIRST SEGMENT OF DATA SET Y HAS BEEN LOST—NO RECOVERY HAS BEEN INITIATED". This allows the storage administrator to determine the best course of action before data is overwritten. The message may be issued directly to a human, such as the storage administrator, or to a machine-readable destination such as an activity log.

On the other hand, if query 812 finds that the current data set does not represent the first segment of a multi-segment data set, control passes to query 816. In this case, even though the data set is not consistent, no valid data might have been lost (i.e., the lost data might be inactive). As mentioned above, the end of each data set segment includes a pointer that either (1) continues to the next segment in the data set, contained on a different volume, or (2) indicates the end of the data set (the "EOD" indicator). Therefore, even if the current data set is not consistent, the data set will not require recovery if the lost data occurs after the EOD indicator; in this case, the subsequent segments are "inactive" and do not contain any data of interest. For example, if the current data set is inconsistent and it is the third data segment in a multi-volume data set, no recovery of the current data set is necessary if the EOD indicator appears in the first or second segment.

Accordingly, query 816 then asks whether valid data has been lost; this determination is made as discussed in greater detail below. If valid data has been lost, task 818 issues a message advising of the data loss. This message may state, for example, "DATA SET Z IS INCONSISTENT, VALID DATA HAS BEEN LOST—NO RECOVERY HAS BEEN INITIATED". This message may be issued directly to a human, such as the storage administrator, or to a machine-readable destination such as an activity log. However, if no valid data was lost, query 816 simply returns control to task 806. After all data sets on the selected volume have been evaluated, task 806 advances to task 820, which ends the routine 800.

Figure 9:
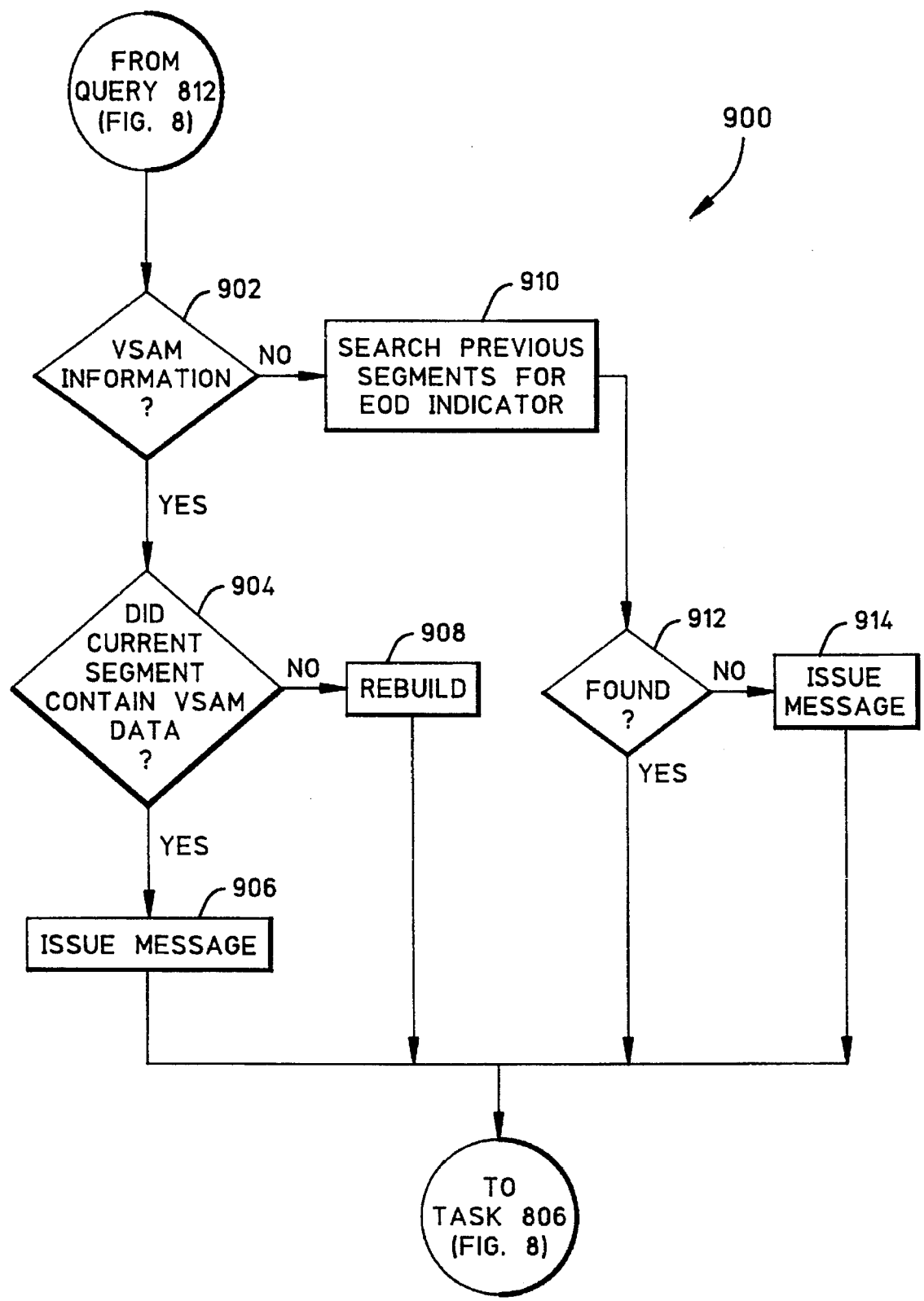
FIG. 9 is a flowchart illustrating additional detail of the single volume recovery method ("CONSISTENT" Option), which was introduced in FIG. 8.

FIG. 9 depicts one possible method for carrying out tasks 816 and 818. First, query 902 asks whether the current data set contains "VSAM" structured information. As an example, query 902 may achieve this by examining the ICF associated with the current data set. The distinction between data segments and index segments is important because the indices can usually be rebuilt from the data. Therefore, if query 902 determines that the current data segment contains VSAM type information, query 904 proceeds to ask whether the current data segment represented data or an index to data. This determination may be made, for example, by reviewing the ICF associated with the current data set.

If query 904 determines that the current segment contained VSAM data (rather than a VSAM index), task 906 issues a message indicating that valid data was lost, and control returns to task 806 (FIG. 8). If query 904 finds that only index information was lost (rather than data), task 908 automatically rebuilds the index segment to any one or more target volumes, based upon the corresponding data. The target volumes may be identified by previous user-entered selections or by a memory management routine, for example.

If query 902 determines that the current data set does not represent VSAM data, task 910 searches the data segments previous to the current segment for the EOD indicator. Task 910 may, for instance, examine the VTOCs of each prior data segment. In FIG. 6, for example, if volume 209 was lost and the current data set is "Z", then task 910 would examine the VTOCs associated with "Z2" and "Z1", i.e. the data segments previous to "Z3".

Query 912 then asks whether the EOD was found in task 910. If so, this indicates that the current data segment contains non-critical information. Accordingly, no further action is taken before returning to task 806 (FIG. 8). If, however, task 910 did not find the EOD in a previous segment, then task 914 issues a message indicating that valid data was lost.

While there have been shown what are presently considered to be preferred embodiments of the invention, it will be apparent to those skilled in the art that various changes and modifications can be made herein without departing from the scope of the invention as defined by the appended claims.

What is claimed is:

1. A method of recovering data formerly stored on multiple volumes from backup storage to the volumes, comprising the steps of:

For a selected one of the volumes, performing steps comprising:

Identifying all data sets partially or completely stored on the selected volume prior to a failure of that volume, wherein each data set includes at least a first data segment stored on the selected volume prior to the failure;

Restoring only identified multi-volume data sets whose first segment was stored on the selected volume prior to the failure, said restoration being conducted to at least one of the volumes; and Deferring restoration of each identified multi-volume data set whose first segment was not stored on the selected volume prior to the failure until restoration of the volume containing the deferred data set's first segment; and Repeating the previous step for each remaining one of the volumes.

2. The method of claim 1, wherein the restoring step further comprises the steps of:

For each identified single volume data set stored on the selected volume prior to the failure, restoring that data set from backup storage to at least one of the volumes.

3. The method of claim 1, wherein the volumes comprise DASDs.

4. The method of claim 1, wherein the volumes comprise optical disk drives.

5. The method of claim 1, wherein the volumes comprise magnetic disk drives.

6. The method of claim 1, wherein the backup storage comprises a magnetic tape medium.

7. A method of recovering data formerly stored on multiple volumes from backup storage to the volumes, comprising the steps of:

(1) Identifying all multi-volume data sets having a segment that was stored on a selected volume prior to failure of that volume, wherein said multi-volume data sets comprise ordered sequences of segments beginning with a first segment;

(2) For a selected one of the identified multi-volume data sets, performing steps comprising:

Determining whether segments of the multi-volume data set stored on other volumes than the selected volume are consistent with a copy of the data set contained in the backup storage;

If so, recovering the data set from backup storage to at least one of the volumes and advancing to step (3);

Ascertaining whether the segment of the identified multi-volume data set stored on the selected volume is the multi-volume data set's first segment;

If so, then issuing a first predetermined message and advancing to step (3);

Performing a determination whether valid data of the selected data set has been lost due to the failure;

If so, issuing a second predetermined message and advancing to step (3); and (3) Repeating step (2) for each remaining identified multi-volume data set.

8. The method of claim 7, further comprising a step of recovering all single volume data sets that were stored on the selected volume prior to failure of that volume.

9. The method of claim 7, wherein the volumes comprise DASDs.

10. The method of claim 7, wherein the volumes comprise optical disk drives.

11. The method of claim 7, wherein the volumes comprise magnetic disk drives.

12. The method of claim 7, wherein the backup storage comprises a magnetic tape medium.

13. The method of claim 7, wherein the identifying step comprises the steps of examining a VTOC copy corresponding to the selected volume.

14. The method of claim 7, wherein the identifying step comprises the steps of examining an ICF corresponding to the selected volume.

15. The method of claim 7, wherein the determining step comprises the steps of examining a change indicator associated with the selected data set.

16. The method of claim 7, wherein the ascertaining step comprises the steps of examining an ICF associated with the selected data set.

17. The method of claim 7, wherein the step of issuing a predetermined message comprises the steps of issuing a predetermined message to a human operator.

18. The method of claim 7, wherein the step of issuing a predetermined message comprises the steps of storing a message in a machine-readable activity log.

19. The method of claim 7, wherein the step of issuing a first predetermined message comprises the steps of activating a light-emitting element in a predetermined pattern.

20. The method of claim 7, wherein the performing step comprises the steps of:

Determining whether the segment of the identified multi-volume data set stored on the selected volume comprises VSAM type information; and If so, determining whether said segment comprises data or index information;

If index information, rebuilding the index from data contained in other segments of the multi-volume data set to at least one of the volumes; and If data information, issuing a predetermined message.

21. The method of claim 7, wherein the performing step comprises the steps of:

Determining whether the segment of the identified multi-volume data set stored on the selected volume comprises VSAM type information;

If not, determining whether an EOD indicator is present in segments of the data set previous to the segment of the identified multi-volume data set stored on the selected volume; and If an EOD indicator is not present, issuing a predetermined message.

22. A data storage device tangibly embodying a program of machine-readable instructions executable by a digital data processor to perform method steps for recovering data from multiple volumes, said method steps comprising the steps of:

For a selected one of the volumes. performing steps comprising:

Identifying all data sets partially or completely stored on the selected volume prior to a failure of that volume, wherein each data set includes at least a first data segment stored on the selected volume prior to the failure;

Restoring only multi-volume data sets whose first segment was stored on the selected volume prior to the failure, said restoration being conducted to at least one of the volumes; and Deferring restoration of each identified multi-volume data set whose first segment was not stored on the selected volume prior to the failure until restoration of the volume containing the deferred data set's first segment; and Repeating the previous step for each remaining one of the volumes.

23. A data storage device tangibly embodying a program of machine-readable instructions executable by a digital data processor to perform method steps for recovering data formerly stored on multiple volumes from backup storage to the volumes, said method steps comprising the steps of:

(1) Identifying all multi-volume data sets having a segment that was stored on a selected volume prior to failure of that volume, wherein said multi-volume data sets comprise ordered sequences of segments beginning with a first segment;

(2) For a selected one of the identified multi-volume data sets, performing steps comprising:

Determining whether segments of the multi-volume data set stored on other volumes than the selected volume are consistent with a copy of the data set contained in the backup storage;

If so, recovering the data set from backup storage to at least one of the volumes and advancing to step (3);

Ascertaining whether the segment of the identified multi-volume data set stored on the selected volume is the multi-volume data set's first segment;

If so, then issuing a first predetermined message and advancing to step (3);

Performing a determination of whether valid data of the selected data set has been lost due to the failure;

If so, issuing a second predetermined message and advancing to step (3); and (3) Repeating step (2) for each remaining identified multi-volume data set.

24. A digital data processing machine, comprising:

Multiple storage volumes;

A memory; and

A processor, coupled to the memory and the storage volumes, and programmed to perform method steps to recover data formerly stored on the volumes from backup storage, said method steps comprising:

For a selected one of the volumes, performing steps comprising:

Identifying all data sets partially or completely stored on the selected volume prior to a failure of that volume, wherein each data set includes at least a first data segment stored on the selected volume prior to the failure;

Restoring only identified multi-volume data sets whose first segment was stored on the selected volume prior to the failure, said restoration being conducted to at least one of the volumes; and Deferring restoration of each identified multi-volume data set whose first segment was not stored on the selected volume prior to the failure until restoration of the volume containing the deferred data set's first segment; and Repeating the previous step for each remaining one of the volumes.

25. A digital data processing machine, comprising:

Multiple storage volumes;

A memory; and

A processor, coupled to the memory and the storage volumes, and programmed to perform method steps to recover data formerly stored on the volumes from backup storage, said method steps comprising:

(1) Identifying all multi-volume data sets having a segment that was stored on a selected volume prior to failure of that volume, wherein said multi-volume data sets comprise ordered sequences of segments beginning with a first segment;

(2) For a selected one of the identified multi-volume data sets, performing steps comprising:

Determining whether segments of the multi-volume data set stored on volumes other than the selected volume are consistent with a copy of the data set contained in the backup storage;

If so, recovering the data set from backup storage to at least one of the volumes and advancing to step (3);

Ascertaining whether the segment of the identified multi-volume data set stored on the selected volume is the multi-volume data set's first segment;

If so, then issuing a first predetermined message to a human operator and advancing to step (3);

Performing a determination of whether valid data of the selected data set has been lost due to the failure;

If so, issuing a second predetermined message to a human operator and advancing to step (3); and (3) Repeating step (2) for each remaining identified multi-volume data set.

26. The method of claim 25, wherein the digital data processing machine is additionally programmed to perform the steps of:

Determining whether the segment of the identified multi-volume data sets stored on the selected volume comprises VSAM type information; and If so, determining whether said segment comprises data or index information;

If index information, rebuilding the index from data contained in other segments of the multi-volume data set to at least one of volumes; and If data information, issuing a predetermined message.

27. The method of claim 25, wherein the digital data processing machine is additionally programmed to perform the steps of:

Determining whether the segment of the identified multi-volume data stored on the selected volume comprises VSAM type information;

If not, determining whether an EOD indicator is present in segments of the data said previous to the segment of the identified multi-volume data set stored on the selected volume; and If an EOD indicator is not present, issuing a predetermined message.

* * * * *